Nov. 21, 1967   H. L. DRAPER ET AL   3,353,798

HOT-MIX COLD-LAY ASPHALT

Filed April 18, 1966

INVENTOR
H. L. DRAPER
D. F. LEVY

BY Young & Quigg

ATTORNEYS 3,353,798
HOT-MIX COLD-LAY ASPHALT
Homer L. Draper and Dale F. Levy, Bartlesville, Okla., assignors to Phillips Petroleum Company, a corporation of Delaware
Filed Apr. 18, 1966, Ser. No. 543,214
7 Claims. (Cl. 259—149)

ABSTRACT OF THE DISCLOSURE

A hot-mix cold-lay asphalt is produced by feeding at metered quantities aggregate, water, asphalt primer and asphalt cement, the means for feeding the aggregate, water, asphalt primer and asphalt cement being synchronously interconnected.

Figure 1:
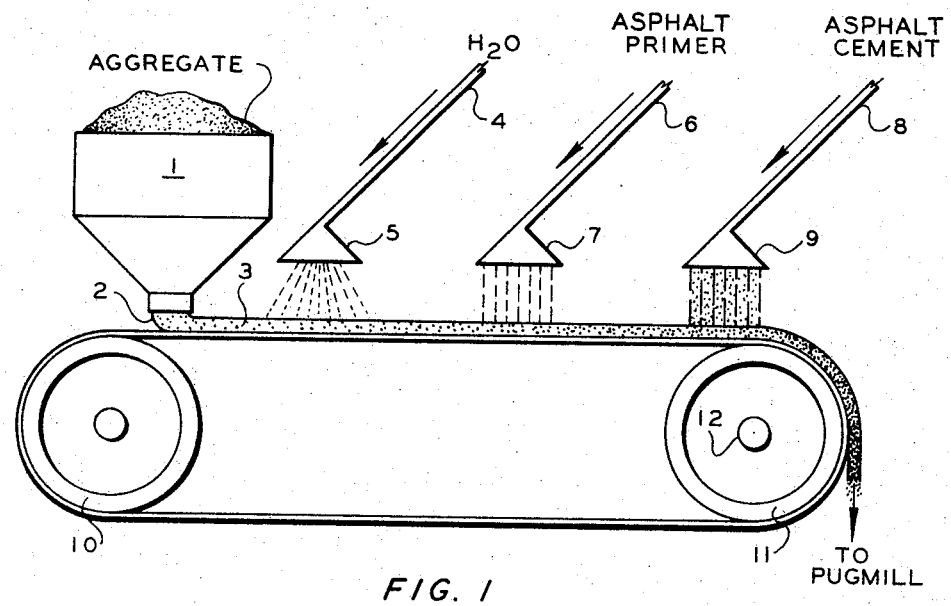

This invention relates to a hot-mix cold-lay asphalt. In one of its aspects, it relates to a method and apparatus for making a hot-mix cold-lay asphalt wherein aggregate, water, asphalt primer and asphalt cement are applied in metered quantities such that a synchronous connection is maintained between the feeding means so that the elements are added proportionally regardless of the speed at which power is supplied to the machine.

A hot-mix cold-lay asphalt is a paving composition which can be mixed in the heated condition and so cooled so that it can be stored without setting into a solid mass. When it is desirable to use the paving composition, it is put in place and compacted with a roller or the like. The compaction causes the paving composition to become a solid mass.

One of the problems in making hot-mix cold-lay asphalt is in insuring that the ranges of compositions which are added, i.e., aggregate, water, asphalt primer and asphalt cement, are controlled within very strict limits. We have now discovered that the asphalt can be successfully produced in a continuous manner by synchronously interconnecting the means which feed the aggregate, water, asphalt primer and asphalt cement to the mixing operation.

A well-known machine for making a hot-mix asphalt composition feeds asphalt and aggregate in controlled proportions. The feeding of the aggregate is synchronously interconnected to a positive displacement pump which feeds asphalt to the operation. The mixture is fed to a pugmill and then must be used as a paving composition or the like while still in the heated condition. We have now discovered that a hot-mix cold-lay asphalt can be produced with an apparatus which synchronously interconnects means which feed aggregate, water, asphalt primer and asphalt cement in a continuous operation.

By various aspects of this invention, one or more of the following or other objects can be obtained.

It is an object of this invention to provide a hot-mix cold-lay asphalt in a continuous process wherein the ratio of materials added are strictly controlled.

It is a further object of this invention to provide a hot-mix cold-lay asphalt-producing apparatus wherein the proportions of added constituents to make the asphalt remain substantially constant regardless of the rate of power supplied to the apparatus.

Other aspects, objects, and the several advantages of this invention are apparent to one skilled in the art from a study of this disclosure, the drawings and the appended claims.

According to the invention, there is provided an apparatus for making a hot-mix cold-lay asphalt wherein the means for supplying aggregate, water, asphalt primer and asphalt cement are synchronously interconnected. The process is preferably carried out continuously.

The invention also relates to a method of producing hot-mix cold-lay asphalt by feeding aggregate, water, asphalt primer and asphalt cement in fixed proportions on to a conveyor wherein the means for feeding the aggregate, water, asphalt primer and asphalt cement are synchronously interconnected.

Figure 2:
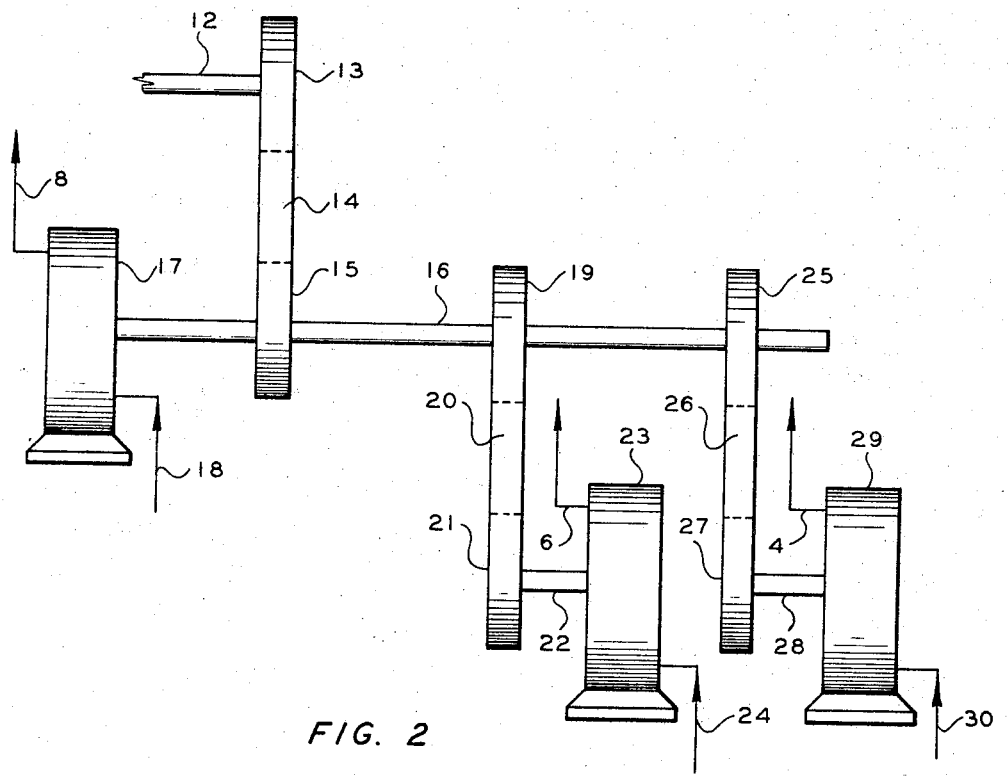

The invention will now be described with relation to the drawing in which FIGURE 1 schematically shows the method and means of mixing the hot-mix cold-lay asphalt; and FIGURE 2 schematically shows the interconnections of the supply means for constituents.

Referring now to the drawings, aggregate 2 from bin 1 is fed onto a conveyor belt and forms a uniform layer 3 on the belt. Water from line 4 is passed through nozzle 5 and added to the aggregate 3. Asphalt primer in line 6 is passed through nozzle 7 and added to the mixture 3 on the conveyor belt. Asphalt cement in line 8 is passed through nozzle 9 and sprayed onto the mass 3. The mixture is then passed by the conveyor belt to a pugmill which thoroughly and intimately mixes the constituents so that a uniform coating on the aggregate will result. The conveyor belt is supported by wheels 10 and 11 and is driven by shaft 12 to which power is supplied. The power from shaft 12 is transferred to shaft 16 by gear means 13, belt 14, and gear means 15. Shaft 16 drives a positive displacement pump 17 which pumps asphalt cement in line 18 through line 8 to nozzle 9. Power is taken off shaft 16 through gear means 19, belt 20, and gear means 21 to drive, by means of shaft 22, positive displacement pump 23 which supplies asphalt primer in line 24 to line 6 and nozzle 7. Power is also taken off shaft 16 by gear means 25, belt 26, and gear means 27 to drive positive displacement pump 29 through shaft 28. Pump 29 supplies water from line 30 to line 4 and nozzle 5.

It can be seen that by the invention the power for supplying aggregate, water, asphalt primer and asphalt cement has been supplied through a single source. Thus, any change in the rate of power supply will not affect the relative proportions of materials being supplied.

The size of gear means 13, 15, 19, 21, 25 and 27 can be adjusted so as to provide the proper proportions of materials to be supplied as is understood by one skilled in the art. Further, the combination of two gears and a belt can be replaced by two simple gears, as is also understood by one skilled in the art.

A positive displacement pump is one which meters a fixed quantity of material for each revolution.

As used in this specification, asphalt primer refers to any suitable asphalt primer such as Phillips Petroleum Company's HM/CL composed of chemically modified asphalt products and selected solvents which effects the polarizing behavior necessary to provide adhesion of asphalt to aggregate and keeps the stockpile in workable condition.

As used in this specification, asphalt cement refers to asphalt that is refined to meet specifications for paving purposes, usually having a penetration range between 40 and 300, as measured by ASTM Test Method D–5.

And, as used in this specification, aggregate refers to crushed stone or other granular materials which are used in the making of paving material.

As a specific example of how the invention works, a hot-mix cold-lay asphalt was made according to the following specifications. (In the composition, the aggregate is considered as 100 weight percent. Other components are based on the dry weight of the aggregate):

| Material: | Weight percent |
|---|---|
| Asphalt cement | 5.0 to 6.0 |
| Water | 1.0 to 2.0 |
| Asphalt primer | .5 to .7 |
| Aggregate | 100 |

On the basis of 60 tons per hour, the system was calibrated as follows:

| Material: | Gallons per minute |
|---|---|
| Asphalt cement | 13.0 |
| Water | 4.2 |
| Asphalt primer | 2.1 |

The sprockets and speeds were as follows:

|  | Driver | Water Pump | Primer Pump |
|---|---|---|---|
| Sprocket Size (number of teeth). | (Water, 30 teeth<br>(Primer, 30 teeth | 12 teeth | 24 teeth. |
| R.P.M. | 200 | 500 | 250. |

The resulting operation proved successful and the hot-mix cold-lay material met specification.

Wherein the invention has been described with the spraying of water first onto the aggregate and then the asphalt primer onto the aggregate, it is within the scope of this invention to spray asphalt primer first onto the aggregate or simultaneously with the water onto the aggregate.

Generally, in carrying out the invention, the following ranges will be used for aggregate, asphalt cement, water, and asphalt primer.

|  | Broad Ranges | Preferred Ranges |
|---|---|---|
| Aggregate | 100% | 100% |
| Asphalt cement | 3-9 | 5-6 |
| Water | 0-5 | 1-2 |
| Asphalt primer | .25-2.0 | .5-1.0 |

Reasonable variation and modification are possible within the scope of the foregoing disclosure, the drawings and the appended claims to the invention, the essence of which is that a hot-mix cold-lay asphalt is produced by feeding in metered quantities aggregate, water, asphalt primer and asphalt cement, the means for feeding the aggregate, water, asphalt primer and asphalt cement being synchronously interconnected.

We claim:

1. An apparatus for making a hot-mix cold-lay asphalt which comprises:
   (a) conveyor belt means to supply a metered amount of aggregate;
   (b) means to add to said metered amount of aggregate on said conveyor belt means a metered amount of water;
   (c) means to add to said aggregate on said conveyor belt means a metered amount of asphalt primer;
   (d) means to supply a metered amount of liquid asphalt cement to said aggregate, water and asphalt primer on said conveyor belt means;
   (e) means to supply power to (a) and (d) such that the two means are synchronously interconnected.

2. An apparatus according to claim 1 wherein there is provided a means for connecting (b) to (e) such that (a), (b) and (d) are synchronously interconnected.

3. An apparatus according to claim 1 wherein there is provided a means for connecting (c) to (e) such that (a), (c) and (d) are synchronously interconnected.

4. An apparatus according to claim 1 wherein there is provided a means for connecting (b) and (c) with (e) so that (a), (b), (c) and (d) are synchronously interconnected.

5. An apparatus according to claim 4 wherein (b), (c) and (d) comprise positive displacement pumps, and power is supplied to a first shaft which drives said pump of (d), a first gear means transfers power from said first shaft to a second shaft which drives said displacement pump of (b), a second gear means transfers power from said first shaft to a third shaft which drives said displacement pump of (c).

6. An apparatus according to claim 5 wherein said conveyor belt means which has power supplied to a fourth shaft which drives said conveyor and a third gear means transfers power from said fourth shaft to said first shaft.

7. A method of making a hot-mix cold-lay asphalt comprising supplying aggregate at a predetermined rate to a conveying zone, adding to aggregate in said conveying zone water and asphalt primer at a metered rate, adding to said aggregate, water and asphalt primer in said conveying zone asphalt cement at a metered rate, passing said mixture to a mixing zone wherein a homogeneous mixture is formed, said rate of adding water, asphalt primer and asphalt cement and said rate of supplying aggregate being synchronously interconnected so that a product having a predetermined range of constituents is formed regardless of the rate at which power is supplied.

References Cited

UNITED STATES PATENTS

| 304,615 | 9/1884 | Church | 259—148 |
| 3,206,174 | 9/1965 | Young | 259—149 |

FOREIGN PATENTS

| 711,505 | 10/1941 | Germany. |
| 880,481 | 10/1961 | Great Britain. |

WALTER A. SCHEEL, *Primary Examiner.*

R. W. JENKINS, *Assistant Examiner.*